(12) United States Patent
Hurley et al.

(10) Patent No.: US 9,360,646 B2
(45) Date of Patent: Jun. 7, 2016

(54) FIBER OPTIC RIBBON CABLE

(71) Applicant: Corning Optical Communications LLC, Hickory, NC (US)

(72) Inventors: William Carl Hurley, Hickory, NC (US); Kenneth Todd James, Lenoir, NC (US); James Phillip Luther, Hickory, NC (US); Radawan Ripumaree, Granite Falls, NC (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 156 days.

(21) Appl. No.: 14/196,011

(22) Filed: Mar. 4, 2014

(65) Prior Publication Data

US 2015/0309274 A1 Oct. 29, 2015

Related U.S. Application Data

(60) Provisional application No. 61/866,260, filed on Aug. 15, 2013.

(51) Int. Cl.
G02B 6/44 (2006.01)

(52) U.S. Cl.
CPC ............ *G02B 6/4404* (2013.01); *G02B 6/4432* (2013.01)

(58) Field of Classification Search
None
See application file for complete search history.

(56) References Cited

U.S. PATENT DOCUMENTS

| 6,321,013 | B1 | 11/2001 | Harkwick, III et al. ...... 385/114 |
| 6,876,807 | B2 | 4/2005 | Lanier et al. ................... 385/128 |
| 6,957,000 | B2 | 10/2005 | McAlpine et al. ............. 385/102 |
| 7,197,215 | B2 | 3/2007 | Baird et al. ..................... 385/113 |
| 2010/0135625 | A1 | 6/2010 | Overton ........................ 385/114 |
| 2013/0129288 | A1* | 5/2013 | Homma ............... G02B 6/4401 385/101 |
| 2013/0163932 | A1* | 6/2013 | Cooke .................. G02B 6/4472 385/76 |
| 2014/0199037 | A1* | 7/2014 | Hurley ................. G02B 6/4403 385/114 |

FOREIGN PATENT DOCUMENTS

| EP | 1286195 A2 | 2/2003 | .............. G02B 6/44 |
| EP | 1326113 A2 | 7/2003 | .............. G02B 6/44 |
| JP | 62-46414 | 3/1987 | .............. G02B 6/44 |

(Continued)

OTHER PUBLICATIONS

Patent Cooperation Treaty, Form ISA/206 for International Application No. PCT/US2014/011234; Mailing date Apr. 14, 2014—5 pages.

(Continued)

*Primary Examiner* — Sung Pak
(74) *Attorney, Agent, or Firm* — William D. Doyle (57) ABSTRACT

A fiber optic ribbon cable includes a fiber optic ribbon or stack of ribbons, strength members surrounding the ribbon or stack, and a jacket defining an exterior of the cable. The jacket forms a cavity through which the strength members and the ribbon or stack extend. The ribbon or stack has a bend preference, but the strength members are flexible and do not have a bend preference. Furthermore, the jacket is structured such that the jacket does not have a bend preference. The cavity is sized relative to the ribbon or stack in order to allow the same to bend and twist within the cavity with respect to the jacket as the cable bends, facilitating movement of the corresponding optical fibers to low-stress positions within the cavity and decoupling the bend preference of the ribbon or stack from transfer to the jacket.

20 Claims, 5 Drawing Sheets

(56) References Cited

FOREIGN PATENT DOCUMENTS

| JP | 2000-206383 A | 7/2000 | ............... G02B 6/44 |
| JP | 2011-232621 A | 11/2011 | ............... G02B 6/44 |

OTHER PUBLICATIONS

Corning Cable Systems, Ribbon Interconnect Cable, Plenum, 4F, Part No. 004TJ8-41191-0F, 2013, 4 pages.

* cited by examiner

FIBER OPTIC RIBBON CABLE

RELATED APPLICATIONS

This Application claims the benefit of U.S. Provisional Application No. 61/866,260, filed Aug. 15, 2013, which is incorporated by reference herein in its entirety.

BACKGROUND

Aspects of the present disclosure relate generally to fiber optic cables. More specifically, some aspects of the present disclosure relate to fiber optic cables supporting ribbons of optical fibers, such as for device-interconnection applications in data centers and the like.

Demand for increasing bandwidth of data communication systems has been addressed by various means, such as using wavelength division multiplexing (WDM). However, costs of transmitters and optical devices for WDM to combine signals at the transmitter and separate them back out at the receiver may be prohibitive for some cost-sensitive applications. Another approach to increasing bandwidth has been increasing transmitter speed from 1 gigabits per second (Gbps) to 10 Gbps, and recently to 25 Gbps, with low-cost vertical-cavity surface-emitting lasers (VCSELs). However, VCSEL technology may have reached a maximum speed limit of 25 Gbps per optical channel and there is demand for 40 Gbps and 100 Gbps systems.

Yet another low-cost solution for increasing bandwidth is use of VCSELs coupled with parallel-optic transmissions, where a signal may be broken down into sub-signals, parsed, communicated via into separate optical fibers for transmission in parallel with one another, and then reconfigured upon receipt. Standard schemes for parallel-optic transmissions are described in IEEE 802.3-2005: Information Technology-Telecommunications information And Exchange Between Systems—LAN/MAN—Specific Requirements—Part 3.

Two types of fiber optic cables used with parallel-optic transmission systems include loose fiber cables and fiber optic ribbon cables. Ribbon cables offer advantages over loose fiber cables, such as ordered arrangements of the optical fibers, facilitating efficient and accurate attachment of a connector to the ribbons. However, traditional ribbon cables may exhibit strong preferential bending and/or are inflexible, such as due to the presence of a buffer tube protecting the ribbon stack, arrangements of rigid strength members, and/or a generally long lay-length of the ribbon stack (i.e. distance for one full twist of the stack). As such, loose fiber cables are currently more-preferred in the industry because they are generally smaller and more flexible. A need exists for a ribbon cable that is flexible and has little or no bend preference, similar to a loose fiber cable, such as for use interconnecting optical devices used with parallel-optic transmission systems.

SUMMARY

One embodiment relates to a fiber optic ribbon cable, which includes a stack of fiber optic ribbons, strength members surrounding the stack, and a jacket defining an exterior of the cable. The jacket forms a cavity through which extend the stack and the strength members. The stack has a bend preference, but the strength members are positioned around the stack or are flexible in bending such that the strength members, when integrated in the cable, do not have a bend preference. Furthermore, the jacket, being round or substantially round and having a generally uniform thickness, is structured such that the jacket does not have a bend preference. The cavity is sized relative to the stack with free space therebetween in order to allow the stack to bend and twist within the cavity with respect to the jacket as the cable bends, facilitating movement of the optical fibers of the fiber optic ribbons to low-stress positions within the cavity and decoupling the bend preference of the stack from transfer to the jacket.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE FIGURES

The accompanying Figures are included to provide a further understanding, and are incorporated in and constitute a part of this specification. The drawings illustrate one or more embodiments, and together with the Detailed Description serve to explain principles and operations of the various embodiments. As such, the disclosure will become more fully understood from the following Detailed Description, taken in conjunction with the accompanying Figures, in which.

DETAILED DESCRIPTION

Before turning to the Figures, which illustrate exemplary embodiments in detail, it should be understood that the present inventive and innovative technology is not limited to the details or methodology set forth in the Detailed Description or illustrated in the Figures. For example, as will be understood by those of ordinary skill in the art, features and attributes associated with embodiments shown in one of the Figures may be applied to embodiments shown in others of the Figures.

Figure 1:
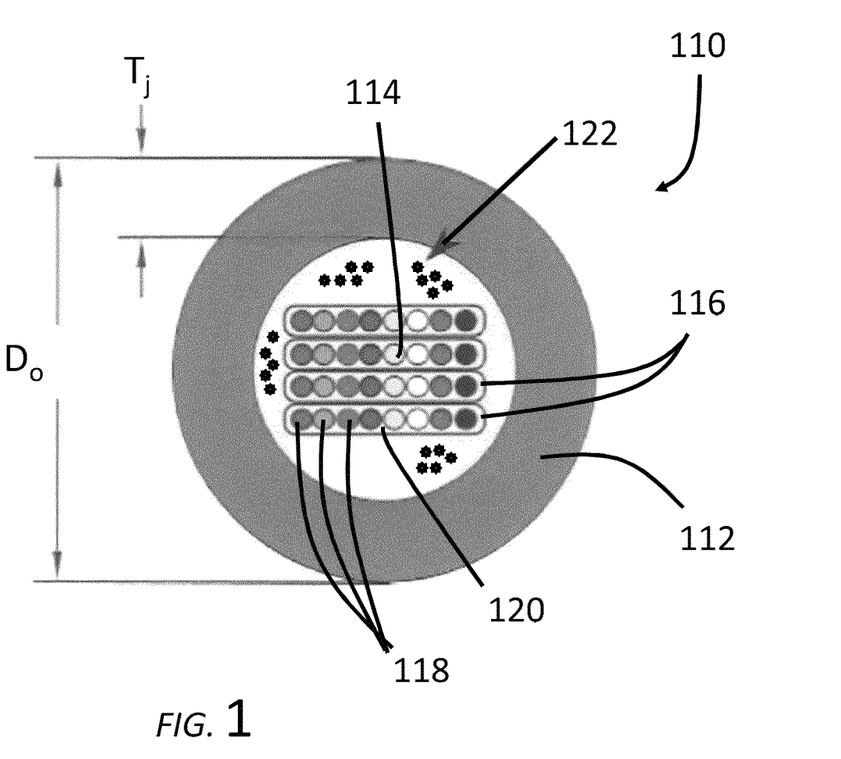
FIG. 1 is a cross-sectional view of a fiber optic cable taken along line 1-1 of FIG. 2, according to an exemplary embodiment.
Figure 2:
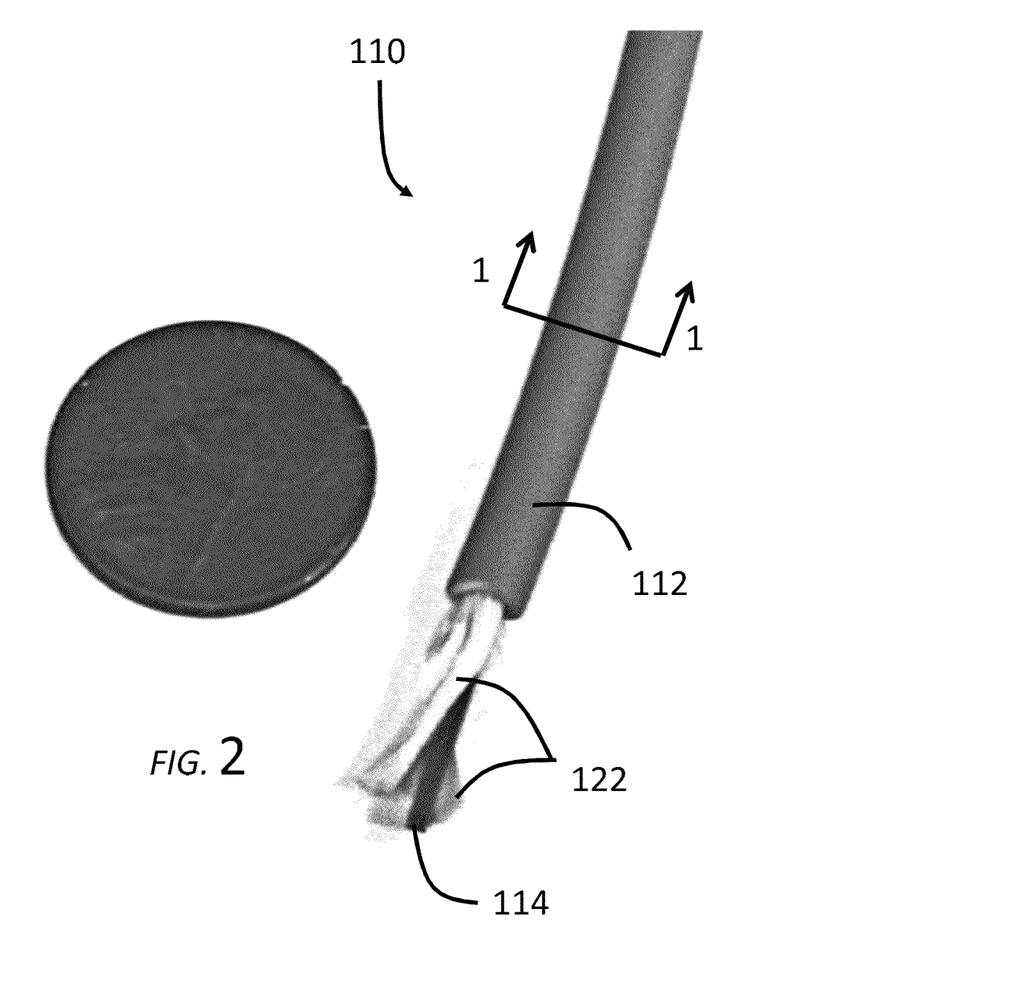
FIG. 2 is a digital image from a perspective view of the cable of FIG. 1.

Referring to FIGS. 1-2, a fiber optic ribbon cable 110 includes a jacket 112 surrounding a stack 114 of fiber optic ribbons 116. According to an exemplary embodiment, the stack 114 of fiber optic ribbons 116 includes at least three fiber optic ribbons 116, where each fiber optic ribbon 116 includes at least eight optical fibers 118 arranged side-by-side and coupled to one another in a common matrix 120, such as an ultra-violet light curable resin (e.g. acrylate). Strength members 122, such as aramid and/or fiberglass yarns, may be disposed between the stack 114 of fiber optic ribbons 116 and the interior 124 of the jacket 112. As shown in FIG. 1, the fiber optic ribbon cable 110 is a small, flexible ribbon cable configured for use with parallel-optic transmission systems, such as the assembly 210 of FIG. 5.

According to an exemplary embodiment, the strength members 122 are not rigid in bending and/or are positioned uniformly around the stack 114 of ribbons 116. By "not rigid in bending," Applicants mean that a 20 cm length of an individual element of the strength member (e.g., one yarn, rod) held horizontally on one end will bend under gravity such that the other end is at least 60-degrees below the horizon. Accordingly, in any such arrangement, the strength members 122 do not individually contribute substantially to a bend preference of the cable 110. With regard to the term "bend preference," Applicants mean that a cantilevered end (with full moment connection) of the respective element (e.g., a cable length of 20 cm) more readily bends in one direction than another such that there is a ratio of maximum to minimum bending moment for the cantilevered element that is greater than one, such as at least 1.5.

According to an exemplary embodiment, the strength members 122 are tensile yarns, such as aramid and/or fiber-glass yarns. In some embodiments, the strength members 122 include at least two tensile yarns of at least 800 denier or greater. The strength members 122 may be stranded, such as helically or spirally wrapped around the ribbon(s). For interconnect applications, the strength members 122 include at least four tensile yarns of at least 800 denier or greater, and the four yarns may be of 1420 denier or greater. The yarns provide tensile strength to the cable and may reduce friction or other contact between the jacket and the ribbon stack. However, Applicants have found that overcrowding of the stack 114 with strength members 122 hampers free movement of the ribbon stack 114 within the jacket 112. Accordingly, in some embodiments, the cable 110 has eight or less tensile yarns with 2000 denier or less. In some embodiments, the strength members 122 include aramid yarns of at least 1000 denier and/or no more than 2000 denier, such as at least 1200 denier and/or no more than 1800 denier. In some embodiments, the strength members 122 include four yarns of aramid. In some embodiments, the strength members 122 include aramid yarns of at least 400 denier individually (i.e. per yarn) and/or no more than 1600 denier individually, such as at least 600 denier individually and/or no more than 1500 denier.

In some such embodiments, the tensile yarns are disposed in contact with the stack 114 of ribbons 116. With the tensile yarns exterior to and surrounding the stack 114, the jacket 112 may be extruded around the tensile yarns without contacting the stack 114. The cable 110 may be made as an indoor/outdoor cable by adding a water-swell yarn or water-swell powders, by increasing the amount of tensile yarn, and/or by selecting the appropriate jacket material (e.g., medium density polyethylene with carbon black additive).

According to an exemplary embodiment, the jacket 112 is formed from a fire-retardant polymer, such as flame-retardant polyethylene, flame-retardant polyvinyl chloride, or another material, that enables the cable 110 to achieve a plenum-, riser-, or low-smoke-zero-halogen (LSZH-) burn listing. However, Applicants have found that use of such material causes the jacket 112 to kink in bending, resulting in greater potential for attenuation, unless the jacket 112 is at least 0.3 thick, such as 0.45 or greater, for a jacket 112 of 5 mm or less in outer diameter $D_o$ (e.g., 4 mm or less). Applicants have found 1.2 mm or less, such as 1 mm or less, to be an upper bound for wall thickness $T_j$ that may provide sufficient flexibility of the cable 110, particularly if no buffer tube or rigid strength members are included. For example, the cable 110 with three eight-fiber ribbons 116, as shown in FIG. 1, has a wall thickness $T_j$ between 0.45 to 0.6 mm, which Applicants find to prevent kinking, provide sufficient fire resistance, and be flexible. Furthermore, the jacket 112 of the cable 110 may be round or substantially round (e.g., octagonal) and uniform in thickness $T_j$ such that the jacket 112 does not contribute substantially to a bend preference of the cable 110.

In some embodiments, a natural or inherent bend preference of the fiber optic ribbons 116 of the stack 114 is a source of bend preference within the cable 110. In some embodiments, the only substantial source of bend preference within the cable 110 is from the natural bend preference of the fiber optic ribbons 116 of the stack 114, such that other sources of bending preference, such as asymmetry provided by ripcord yarns, markings on the jacket 112, and the like, result in bend preference that is less than the bend preference of the ribbon stack 114 by an order of magnitude or more.

According to an exemplary embodiment, the stack 114 of ribbons 116 is loosely positioned within a jacket 112 such that the stack 114 has room to flex and bend as the cable 110 bends, allowing the optical fibers 118 of the stack 114 to move to low-stress positions as the cable 110 is handled. Use of free space works in conjunction with the other structural features of the cable to reduce the net preferential bend by at least partially decoupling the ribbon stack 114 from the interior of the jacket 124. Put another way, elimination of preferential bending may be achieved, in substance, by allowing sufficient free space within the cable 110 for the ribbon stack 114 to the flex, twist, and adjust position when the cable 110 bends.

According to an exemplary embodiment, such as one with a round cross-section of the cable 110, the inside diameter of the cable 110 is at least 0.2 mm larger than the ribbon stack diagonal distance between opposite corners, such as at least 0.4 mm; but, preferably less than 1.0 mm larger, such as less than 0.6 mm. In other embodiments, the free space may vary based on the number of fibers 116 in the ribbons 114 (and corresponding ribbon width), the number of ribbons 114 in the cable 110 (and corresponding stack height), and properties of the jacket material, such as jacket roughness or smoothness, coefficient of friction between the ribbons and the jacket material, modulus or strength of the material, and other properties.

In contemplated embodiments, with high-performance bend-insensitive optical fibers 118 (e.g., some ClearCurve® fibers manufactured by Corning Incorporated), the amount of free space within the ribbon cable 110 may be reduced while keeping attenuation due to cable bending within acceptable levels. For example, some such cables 110 may have an outer diameter $D_o$ of 3.0 mm or less with a wall thickness $T_j$ of 0.45 mm or less, and/or an inner diameter $D_i$ of about 2.5 mm or less. Some such cables, may have about 0.1 mm of free space, but may still have relatively low attenuation because of the unique properties of the high-performance bend-insensitive optical fibers 118.

In some embodiments, the fibers 118 are "bend-insensitive" in that one-wrap of the fiber 118 around a 10 mm diameter mandrel results in an optical attenuation increase of less than 0.5 dB, less than 0.3 dB, less than 0.2 dB, or even less than 0.15 dB at an 850 nm wavelength, one-wrap of the fiber 118 around a 20 mm diameter mandrel results in an optical attenuation increase of less than 0.2 dB, less than 0.1 dB, or even less than 0.05 dB at an 850 nm wavelength, and/or one-wrap of the fiber 118 around a 15 mm diameter mandrel results in an optical attenuation increase of less than 0.2 dB, less than 0.1 dB, or even less than 0.05 dB at an 850 nm wavelength.

In some such embodiments, the optical fibers 118 includes structure that facilitates bend-insensitivity, including a glass core surrounded by a glass cladding, where the glass cladding includes annular regions or layers, such as at least two layers, at least three layers. A first of the annular regions has a refractive index that is lower than the average refractive index of the core, which thereby reflects errant light back to the core. A second of the annular regions of the cladding has a refractive index that differs from the first of the annular regions. The second annular region may be up-doped, trapping errant light from the core and improving the performance of the optical fiber 118 in terms of reduced attenuation from macro-bending. Or, the second annular region may be down-doped, further reflecting errant light from the core and improving the performance of the optical fiber 118 in terms of reduced attenuation from macro-bending.

According to an exemplary embodiment, the glass cladding of each optical fiber 118 is surrounded by polymer layers, such as interior and exterior layers of ultra violet light curable acrylate materials or other polymeric materials. The interior polymer layer (e.g., soft layer, stress-isolation layer) has a lower modulus of elasticity than the exterior polymer layer (e.g., hard layer, shell), such as by at least half the modulus of the exterior layer. Accordingly, the exterior polymer layer of the optical fiber 118 limits scratching and wear of the optical fiber 118 and the interior polymer layer mitigates transmission of stresses to the glass core and cladding, which, in turn, limits associated attenuation from micro-bending.

According to an exemplary embodiment, the ribbon stack 114 of the cable 110 is stranded and has a lay length (i.e. the lengthwise distance along the cable for one complete turn of the twisted stack), such as between 400-800 mm, more preferably in the range of 500 mm to 700 mm, which helps the cable to bend and facilitates use of a ribbon cable in the crowded and low-space environment of a typical data center. The lay length may be at least 400 mm and/or 800 mm or less, such as at least 500 mm and/or 700 mm or less.

Figure 5:
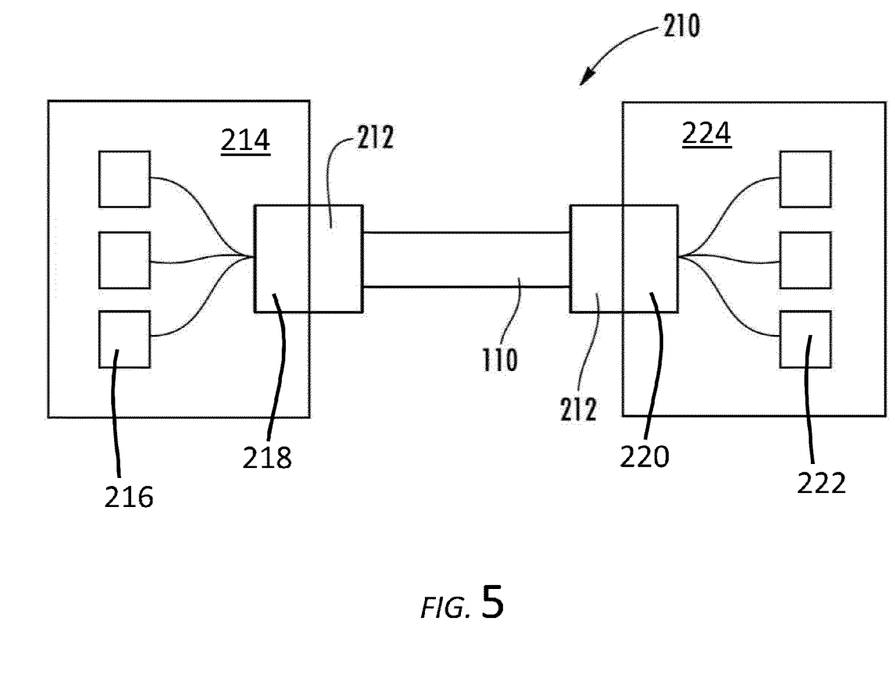
FIG. 5 is a schematic diagram of an assembly for high-speed data communication according to an exemplary embodiment.

Referring now to FIG. 5, the fiber optic ribbon cables disclosed herein may be terminated with multi-fiber connectors 212 on each end, such as when used for parallel-optic transmission. The number of fibers 118 in the ribbons 116 and the number of ribbons 116 in the cable 110 may be determined by the specific application. For example, of two preferred current configurations for parallel optics, one method uses four fibers 118 for transmitting and another four for receiving the signal. Such a system may achieve 40 Gbps with 10 Gbps transmitters or 100 Gbps with 25 Gbps transmitters. The second configuration uses ten fibers 118 for transmitting and ten for receiving, which is generally achieved with two 12-fiber ribbons. For example, as shown in FIG. 5, on one side the cable 110 may be connectorized with connector 212 which is received by a plug 218 of server 214, where the plug 218 furcates the optical fibers and directs subsets of the optical fibers from the cable 110 to modules 216. On the other side of cable 110, a plug 220 receives the other connector 212, where the plug 220 is part of switch 224 and directs subsets of the optical fibers of the cable 110 to modules 222 thereof.

Some cables disclosed herein have the advantage over traditional ribbon cables of being smaller, lighter in weight, and/or more flexible. The smaller size reduces the amount of materials in the cable and reduces materials cost. The cable has an advantage over traditional ribbon interconnect cables of eliminating preferential bending and enabling interconnect cables with more than two ribbons. Another advantage is that the ribbons can be more robust than traditional ribbons because there may be no requirement to access each fiber individually. This can be achieved by selecting matrix materials with stronger bonding to the fibers, such as by curing the matrix in gas of at least 10% oxygen by volume and/or less than the amount of oxygen in air, such as at least 10% less than the average volume of oxygen in air at sea level at 25 degrees Celsius.

Yet another advantage of ribbon cables, disclosed herein, is the ability to directly connectorized the ribbons (i.e. attach and integrate with a connector), without a need to "ribbonize" loose optical fibers (i.e. align the fibers side-by-side) or re-sequence loose optical fibers. Optical fiber order and relative positioning within each fiber optic ribbon has been maintained by the ribbon matrix. Accordingly, use of the ribbon cables may facilitate or enable automation or higher speeds/efficiency of "jumper," "pigtail," or "harness" cable assembly manufacturing, enhancing productivity and reducing manufacturing costs.

Figure 3:
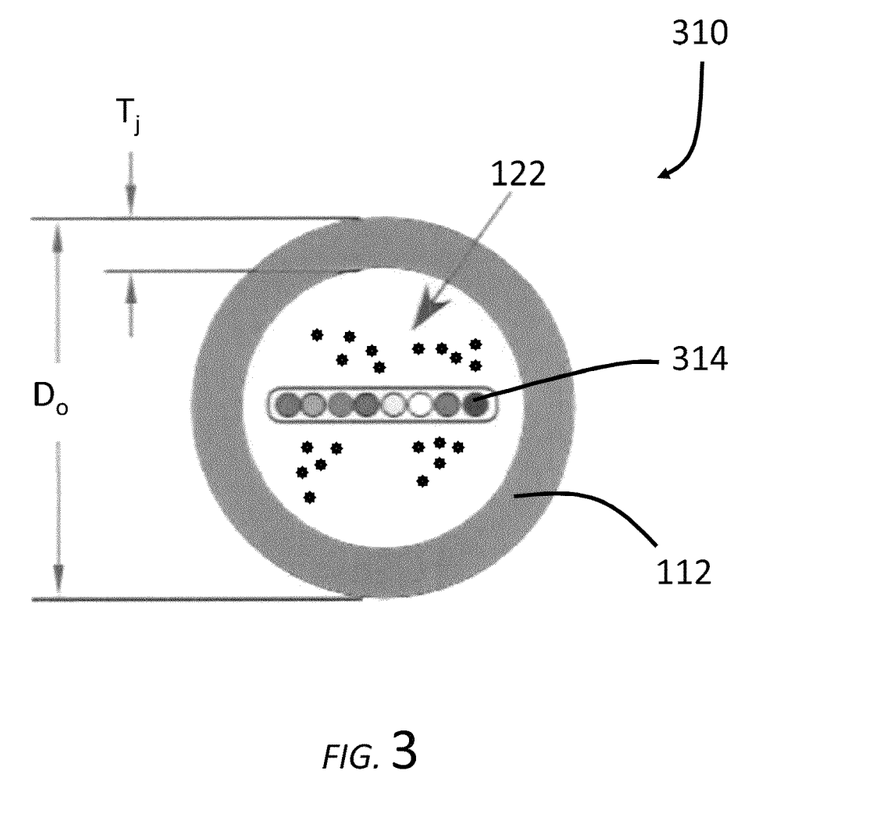
FIG. 3 is a cross-sectional view of a fiber optic cable taken along line 3-3 of FIG. 4, according to an exemplary embodiment.
Figure 4:
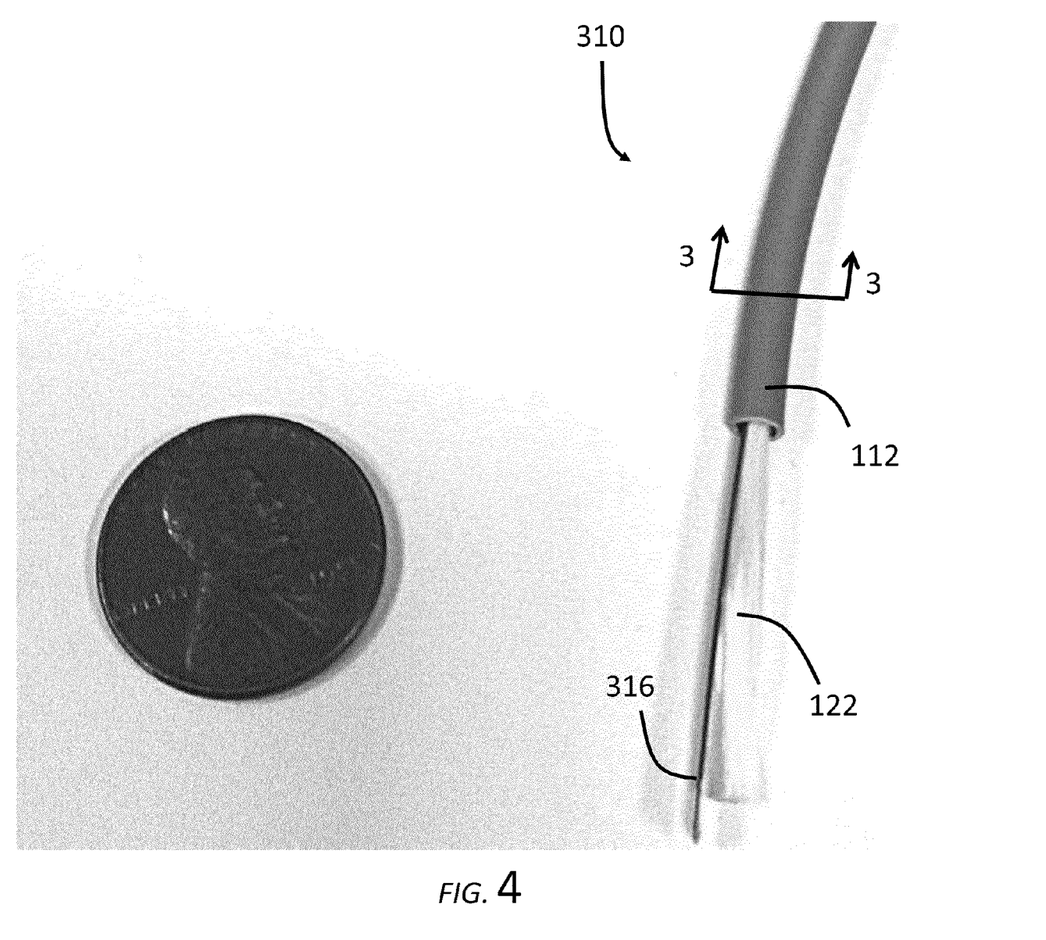
FIG. 4 is a digital image from a perspective view of the cable of FIG. 3.

Referring to FIGS. 3-4, a cable 310, with features similar to those of cable 110 or other cables disclosed herein, includes one fiber optic ribbon 314 containing from four to twelve optical fibers 118. In other embodiments, the stack 114 of FIG. 1 includes more ribbons 116 and/or some or all of the ribbons 116 contain more or fewer optical fibers 118, the ribbons of the stack may have differing numbers of optical fibers 118, such as a "pyramid" stack having wider ribbons toward the base of the pyramid. In contemplated embodiments, the cable includes more than one stack of fiber optic ribbons. The optical fibers 118 of the fiber optic ribbons 116 or ribbon 314 may be single-mode fibers, multi-mode fibers, multi-core fibers, bend-insensitive fibers, plastic optical fibers, or other types of optical fibers. The fiber optic ribbons may be fully encased in matrix resin, or only partially surrounded by resin or another bonding agent.

Referring now to FIGS. 1-4, fiber optic ribbon cable 110, 310 simply includes a jacket defining an exterior of the cable, a ribbon 314 or stack 114 of fiber optic ribbons 116, and yarns, such as strength members 122. According to an exemplary embodiment, the jacket 112, ribbons 116, 314 and strength members 122 are specifically designed to decouple the bend preference of the fiber optic ribbons 116, 314 from transfer to the jacket 112 so that handling of the cable from the exterior of the jacket 112 is free of a bend preference. As such, the ribbon cable 110, 310 may be wound through tight routing configurations, with ease.

According to an exemplary embodiment, the jacket 112 defines an exterior of the cable. The cable may be placed with other such cables within larger ducts or conduits for efficient routing and distribution. The jacket 112 forms a cavity (e.g., closed loop defining an annular passage) through which extends the fiber optic ribbons 116, 314. In some such embodiments, the jacket 112 is formed from an isotropic polymer, such as a solid sol colloid with fire-retardant additives and/or fillers. In some embodiments, the jacket is formed from fire-retardant polyvinyl chloride, fire-retardant polyethylene, or other materials. In some embodiments, the jacket has a uniform annular cross-section. Due at least in part to the geometry and materials of the jacket 112, in contrast to the fiber optic ribbons 116, 314, the jacket is generally free of a bend preference.

In some embodiments, such as for the cable 110 as shown in FIGS. 1-2, the outer diameter $D_o$ of the jacket is within 1.5 mm of 5 mm on average (e.g., over a length of at least 10 m), such as within 0.5 mm of 4.5 mm on average, such as within 0.15 mm of 4.5 mm on average. The small outer diameter $D_o$ allows for efficient placement in confined environs, such as data centers. Further, in some embodiments, the corresponding wall thickness $T_j$ of the jacket is within 0.5 mm of 1 mm on average, such as within 0.25 mm of 0.85 mm on average, such as within 0.1 mm of 0.85 mm on average. Such thickness $T_j$ in combination with the above-described outer diameter facilitate controlled bending of the cable, corresponding to the bending needs in a data center and/or the bending capability of the stack of fiber optic ribbons with minimal macro-bending attenuation, without kinking of the jacket.

The dimensions of the cable may be even more convenient for data center application with only one fiber optic ribbon. In some such embodiments, such as for the cable 310 as shown in FIGS. 3-4, the outer diameter $D_o$ of the jacket is within 1.5 mm of 4 mm on average (e.g., over a length of at least 10 m), such as within 0.5 mm of 3.6 mm on average, such as within 0.2 mm of 3.6 mm on average. Further, in some such embodiments, the corresponding wall thickness $T_j$ of the jacket is within 0.5 mm of 0.5 mm on average, such as within 0.25 mm of 0.5 mm on average, such as within 0.1 mm of 0.5 mm on average.

According to an exemplary embodiment, the cavity of the jacket 112 is round in cross-section and the stack of fiber optic ribbons 114 is rectangular in cross-section and the ribbons 116, 314 are oblong (having a wider width than height, and extending the length of the cable). The diameter of the cavity is at least 0.1 mm, such as at least 0.2 mm greater than the diagonal of the stack 114 and/or width of ribbon 314; and the diameter of the cavity is no more than 2 mm, such as no more than 1.5 mm greater, such as no more than 1 mm greater than the diagonal of the stack 114 and/or width of ribbon 314. Further, in some embodiments, the strength members 122 are loosely positioned in the cavity between the fiber optic ribbons 116, 314 and the jacket 112. According to an exemplary embodiment, the strength members 122 are yarns, such as tensile yarns, where the strength members 122 are flexible in bending such that the strength members 122 are free of a bend preference. For example, the strength members 122 may include yarns of water-swellable aramid, fire-retardant aramid, or other types of aramid, fiberglass or other tensile yarns. The cable 110, 310 may include rip-cord yarns. The jacket 112 may include embedded material discontinuities, such as embedded polypropylene strips, that facilitate tearing open the jacket 112.

According to an exemplary embodiment, the cavity of the jacket 112 is sized relative to the fiber optic ribbons 116, 314 in order to allow the fiber optic ribbons 116, 314 to bend and twist within the cavity with respect to the jacket 112 as the cable 110, 310 bends. The strength members 122 facilitate the relative movement between the jacket 112 and the fiber optic ribbons 116, 314 by the strength members 122 sliding along the interior of the jacket 112 when the cable 110, 310 is in bending and twisting, as necessary, assisting movement of the optical fibers 118 to low-stress positions within the cavity and decoupling the bend preference of the fiber optic ribbons 116, 314 from transfer to the jacket 112 so that handling of the cable 110, 310 from the exterior of the jacket 112 feels free of a bend preference to a handler.

The construction and arrangements of the fiber optic ribbon cables, as shown in the various exemplary embodiments, are illustrative only. Although only a few embodiments have been described in detail in this disclosure, many modifications are possible (e.g., variations in sizes, dimensions, structures, shapes, and proportions of the various members, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present inventive and innovative technology.

What is claimed is:

1. A fiber optic ribbon cable, comprising:
    a fiber optic ribbon having a bend preference, wherein the cable includes only one fiber optic ribbon, and wherein the fiber optic ribbon includes at least eight fibers;
    a jacket defining an exterior of the cable, wherein the outer diameter of the jacket is within 0.5 mm of 3.6 mm on average, wherein the wall thickness of the jacket is within 0.25 mm of 0.5 mm on average, and wherein the jacket forms a cavity through which extends the fiber optic ribbon, and wherein the jacket is substantially free of a bend preference, wherein the cavity of the jacket is round in cross-section and the fiber optic ribbon is oblong or rectangular in cross-section, wherein the diameter of the cavity is at least 0.2 mm greater than the width of the fiber optic ribbon, and wherein the diameter of the cavity is no more than 1.5 mm greater than the width of the fiber optic ribbon;
    strength members loosely positioned in the cavity between the fiber optic ribbon and the jacket, wherein the strength members are flexible in bending such that the strength members are substantially free of a bend preference; and
    wherein the cavity of the jacket is sized relative to the fiber optic ribbon in order to allow the fiber optic ribbon to bend and twist within the cavity with respect to the jacket as the cable bends and the strength members facilitate the relative movement between the jacket and the fiber optic ribbon by sliding along the interior of the jacket when the cable is in bending and twisting, assisting movement of the optical fibers of the fiber optic ribbon to low-stress positions within the cavity and decoupling the bend preference of the fiber optic ribbon from transfer to the jacket so handling of the cable from the exterior of the jacket is generally free of a bend preference.

2. The cable of claim 1, wherein the strength members contact both the fiber optic ribbon and the jacket.

3. The cable of claim 2, wherein the strength members comprise aramid yarn of at least 400 denier per yarn and no more than 1600 denier per yarn.

4. The cable of claim 3, wherein the strength members comprise aramid yarn of at least 600 denier per yarn and no more than 1500 denier per yarn.

5. A fiber optic ribbon cable, comprising:
    a stack of fiber optic ribbons having a bend preference, wherein the stack includes at least two and no more than four fiber optic ribbons, and wherein the ribbons each include at least eight fibers;
    a jacket defining an exterior of the cable, wherein the jacket forms a cavity through which extends the stack of fiber optic ribbons, wherein the outer diameter of the jacket is within 0.5 mm of 4.5 mm on average, wherein the wall thickness of the jacket is within 0.25 mm of 0.85 mm on average, and wherein the jacket is substantially free of a bend preference, wherein the cavity of the jacket is round in cross-section and the stack of fiber optic ribbons is generally rectangular in cross-section, wherein the diameter of the cavity is at least 0.2 mm greater than the diagonal of the stack, and wherein the diameter of the cavity is no more than 1.5 mm greater than the diagonal of the stack;

strength members loosely positioned in the cavity between the stack of fiber optic ribbons and the jacket, wherein the strength members are flexible in bending such that the strength members are substantially free of a bend preference; and wherein the cavity of the jacket is sized relative to the stack of fiber optic ribbons in order to allow the stack of fiber optic ribbons to bend and twist within the cavity with respect to the jacket as the cable bends and the strength members facilitate the relative movement between the jacket and the stack of fiber optic ribbons by sliding along the interior of the jacket when the cable is in bending and twisting, assisting movement of the optical fibers of the stack of fiber optic ribbons to low-stress positions within the cavity and decoupling the bend preference of the stack of fiber optic ribbons from transfer to the jacket so handling of the cable from the exterior of the jacket is generally free of a bend preference.

6. The cable of claim 5, wherein the strength members contact both the stack of fiber optic ribbons and the jacket.

7. The cable of claim 6, wherein the strength members comprise aramid yarn of at least 400 denier per yarn and no more than 1600 denier per yarn.

8. The cable of claim 7, wherein the strength members comprise aramid yarn of at least 600 denier per yarn and no more than 1500 denier per yarn.

9. The cable of claim 8, wherein the strength members comprise four yarns of aramid.

10. The cable of claim 5, wherein the diameter of the cavity is at least 0.4 mm greater than the diagonal of the stack, and wherein the diameter of the cavity is no more than 0.6 mm greater than the diagonal of the stack.

11. A fiber optic ribbon cable, consisting essentially of only three components:
(1) a stack of fiber optic ribbons,
(2) a jacket, wherein jacket defines an exterior of the cable and forms a cavity through which extends the stack of fiber optic ribbons, wherein the cavity of the jacket is round in cross-section and the stack that is generally rectangular in cross-section, wherein the diameter of the cavity is at least 0.1 mm greater and no more than 2 mm greater than the diagonal of the stack on average; and
(3) yarns, wherein the yarns include strength members in the form of tensile yarns positioned in the cavity between the stack of fiber optic ribbons and the jacket.

12. The cable of claim 11, wherein the fiber optic ribbons include at least three fiber optic ribbons, wherein each fiber optic ribbon includes at least eight optical fibers arranged side-by-side and coupled to one another in a common matrix.

13. The cable of claim 12, wherein the stack is helically wound through the cavity and has an average lay length in the range of 400 mm to 800 mm.

14. The cable of claim 11, wherein the cavity of the jacket is round in cross-section and the fiber optic ribbons are arranged in a stack that is generally rectangular in cross-section, wherein the diameter of the cavity is at least 0.2 mm greater than the diagonal of the stack, and wherein the diameter of the cavity is no more than 1 mm greater than the diagonal of the stack.

15. The cable of claim 14, wherein the diameter of the cavity is at least 0.4 mm greater than the diagonal of the stack, and wherein the diameter of the cavity is no more than 0.6 mm greater than the diagonal of the stack.

16. The cable of claim 11, wherein the jacket is formed from a polymeric material that is flame retardant, isotropic, and formed in an annulus having an outer diameter of 5 mm or less.

17. The cable of claim 16, wherein the jacket has a thickness of at least 0.45 mm.

18. The cable of claim 17, wherein the thickness of the jacket is 1.2 mm or less.

19. The cable of claim 11, wherein optical fibers of the fiber optic ribbon are bend-insensitive such that one-wrap of the optical fibers around a 10 mm diameter mandrel results in an optical attenuation increase of less than 0.5 dB at an 850 nm wavelength.

20. The cable of claim 19, wherein the bend-insensitive optical fibers each comprise a glass core surrounded by a glass cladding, wherein the glass cladding comprises annular regions, wherein a first of the annular regions has a refractive index that is lower than the average refractive index of the core, thereby reflecting errant light back to the core, and wherein a second of the annular regions of the cladding has a refractive index that differs from the first of the annular regions, thereby further reflecting or trapping errant light from the core, wherein the glass cladding of each optical fiber is surrounded by interior and exterior polymer layers, wherein the interior polymer layer has a lower modulus of elasticity than the exterior polymer layer, whereby the exterior polymer layer of the optical fiber limits scratching and wear of the optical fiber and the interior polymer layer mitigates transmission of stresses to the glass core and cladding, thereby limiting associated attenuation from micro-bending.

* * * * *